May 28, 1946.  A. S. VOLPIN  2,401,123
VALVE
Filed Jan. 3, 1944  2 Sheets-Sheet 1
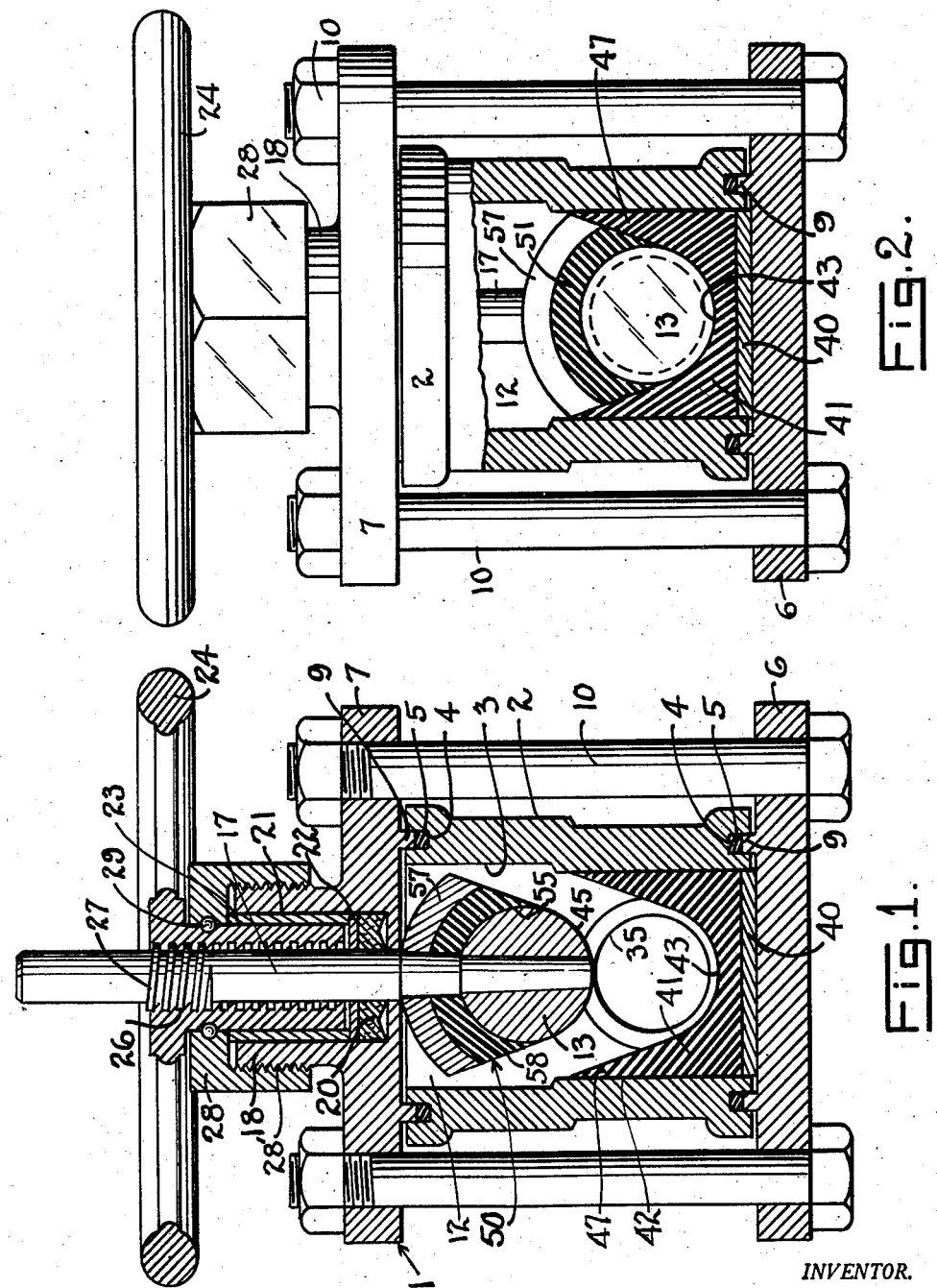
INVENTOR.
ALEXANDER S VOLPIN.
BY Lester B. Clark.
ATTORNEY.

May 28, 1946.  A. S. VOLPIN  2,401,123
VALVE
Filed Jan. 3, 1944  2 Sheets-Sheet 2
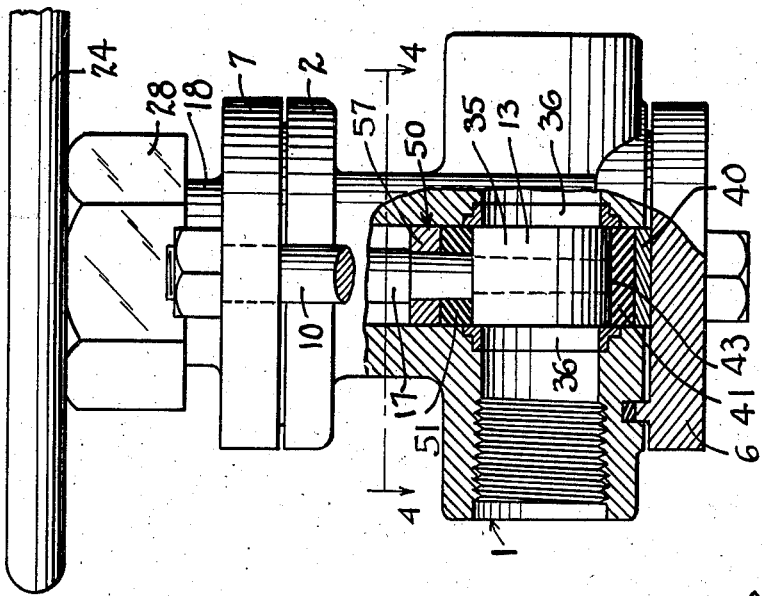
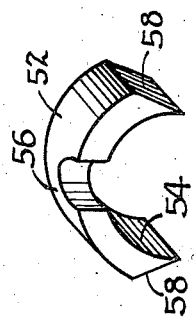
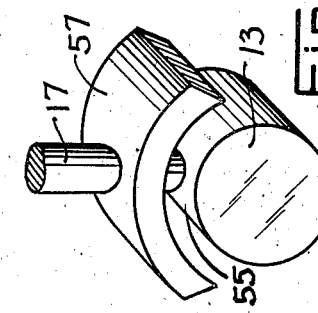
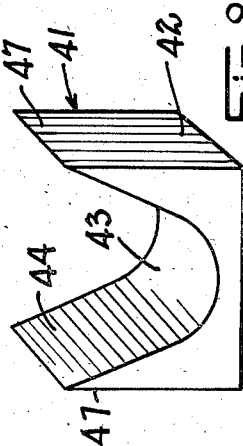
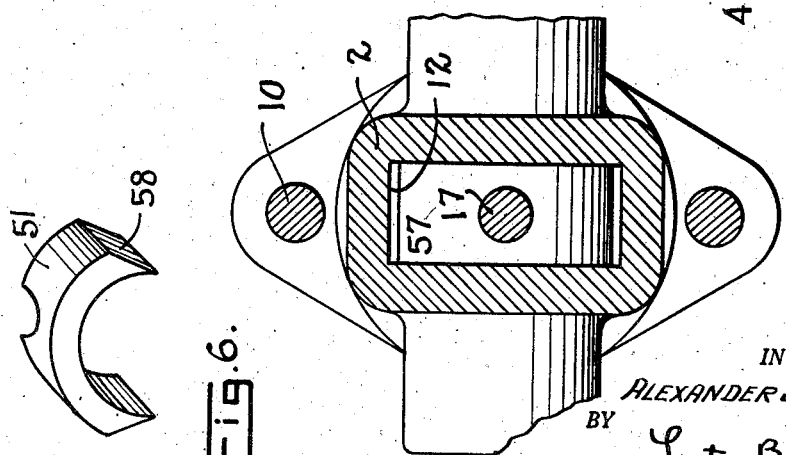
INVENTOR.
ALEXANDER S. VOLPIN.
BY
Lester B. Clark
ATTORNEY.

Patented May 28, 1946

2,401,123

UNITED STATES PATENT OFFICE 2,401,123

VALVE

Alexander S. Volpin, Houston, Tex., assignor to Garrott Brass and Machine Company, Houston, Tex., a corporation of Texas Application January 3, 1944, Serial No. 516,751

7 Claims. (Cl. 251—167)

The invention relates to a valve for closing the flow in a pipe, wherein the valve can be readily assembled and disassembled and any desired pressure applied thereto to effect a sealing of the valve due to the fact that the sealing portions thereof are completely confined and of resilient materials so that the pressure is uniformly distributed therethrough.

It is one of the objects of the invention to provide a valve closure wherein the closure member is completely sealed by a confined resilient material in which a pressure in excess of the pressure being sealed can be established.

Another object of the invention is to provide a resilient saddle seat for gate valves to provide a seal thereabout.

Another object of the invention is to provide a resilient gate valve seat in combination with a resilient cap movable with the gate so as to establish a predominant pressure in the resilient sealing material as the gate moves to closed position.

Another object of the invention is to provide a valve comprising an open body with closure flanges at each end thereof so as to facilitate assembly and repair of the valve construction.

Another object of the invention is to provide a two part sealing assembly for gate valves wherein one part is carried by the gate member and forced against the other part of the sealing assembly and the whole confined by the movement of the gate valve to establish a sealing pressure.

Other and further objects of the invention will be readily apparent when the following description is considered in connection with the accompanying drawings wherein:

Fig. 1 is a vertical sectional view of the valve of the invention with the gate in open position.

Fig. 2 is a section similar to Fig. 1 with the gate in closed position.

Fig. 3 is a side elevation with certain parts in section to illustrate the gate in closed position.

Fig. 4 is a section taken on the line 4—4 of Fig. 3.

Fig. 5 is a perspective view of the gate and the confining cap plate.

Figs. 6 and 7 illustrate the complementary segments making up the cap sealing member.

Fig. 8 is a perspective view of the sealing saddle which is to receive the gate member.

In Fig. 1 the valve is illustrated generally at 1 and is made up of a body 2 which has an opening 3 extending entirely therethrough. This body may be of any desired configuration, but as seen in Fig. 4 is substantially rectangular. This body has a packing groove 4 at each end thereof to receive a packing ring 5 whereby a seal is formed with the bottom flange or closure plate 6 and the upper flange or closure plate 7. The body or closure plate 6 is shown as being flat and having a rib 9 thereon to fit into the groove 4 to compress the packing when the two plates 6 and 7 are drawn firmly against the body 2 by the series of bolts and nuts 10. The upper flange plate 7 has a similar ridge 9 which forms a seal at the top of the body.

When these parts are thus assembled the gate chamber 12 is formed and is arranged to receive the cylindrical gate 13 carried by the stem 17 which is in turn supported in the bonnet portion 18 formed on the top flange 7. A packing 20 deposited in the recess 21 and confined by the plate 22 and the sleeve 23 serves to form a seal about the stem 17. The hand wheel 24 has the extension 25 thereon which has complementary threads 26 to engage the threads 27 on the stem so that rotation of the wheel causes raising and lowering of the stem 17. A hold down bushing 28 is threaded at 28' on the bonnet 18 and the antifriction bearings 29 assist in the ready rotation of the hand wheel. It seems obvious that by rotating the hand wheel the gate 13 will be raised or lowered to cover or uncover the ports 35 which are disposed on opposite sides of the gate chamber 12.

When the gate member moves from the open position of Fig. 1 to the closed position of Fig. 2 it is necessary to have a complete seal about the gate member so as to prevent leakage through the valve and to this end a support plate 40 is disposed on the bottom flange 6 inside of the chamber 12 so as to serve as a support for the resilient saddle member 41. This saddle member is best seen in perspective in Fig. 8 and is made up of a body of resilient material having a rectangular or other configuration to fit the gate chamber 12. The outer faces 42 of this saddle member are plain faces to fit and form a seal with the faces of the body 2 and the support plate 40.

The saddle 41 is formed with a curved seat 43 which merges with the straight inclined faces 44 to form what may be designated as a rounded V configuration. The curved surface 43 is of the same curvature as the lower peripherial surface 46 of the gate 13 so that as the gate moves to the closed position seen in Fig. 2 the resilient material of the saddle will be compressed and caused to flow in all directions upwardly and around the gate member into the tapered walls 47 of the saddle member.

In order to confine the saddle member and complete a seal about the gate member 13 a cap seal 50 made up of two complementary sections 51 and 52 of a suitable resilient material have been provided. These sections have an under curved face 54 to fit the upper face 55 of the gate member and they have a top curved surface 56 to fit the under curved surface of the cap plate 57 which is carried by the valve stem 17 as seen in Fig. 5. This cap plate is preferably fixed on the valve stem and the resilient sections are slipped in laterally to the assembled position of Figs. 1 and 3. The ends 58 of these curved sections 51 and 52 are inclined at substantially the same angle as the flat faces 44 on the saddle member and tapered down to a thin edge at 59 which is substantially tangent with the curvature of the gate member 13. The cap plate 57 overlies these resilient sections so that when the gate member moves to the closed position of Fig. 2 that additional downward movement of the gate member tends to cause the cap plate 57 to confine the sealing assembly comprising the saddle 41 and the sections 51 and 52. It seems obvious that by turning the hand wheel 24 a desired pressure can be imparted to this sealing material due to the fact that it is completely confined and that where this pressure imparted to the sealing material exceeds the pressure in the flow line at the ports 35 that there will be a complete sealing or closure of the valve. This is true because as the gate engages the curved portion 43 the resilient material will be displaced causing the faces 44 to bulge and engage the ends 58 of the cap sections 51 and 52 so that the confining action of the cap plate 57 causes the imparted pressure to be established in the cap sections as well as the saddle.

Fig. 3 shows an edge elevation where the ports 35 are formed by a replaceable ring 36. It seems obvious that the entire assembly adapts itself to ready replacement of the parts. If the saddle is to be replaced the bottom plate 6 can be readily removed and a new saddle inserted or the wear rings 36 at the ports can be replaced. On the other hand if the gate or any of its assembled parts are to be replaced the top flange 7 may be removed and suitable repairs accomplished including the replacement of sections 51 and 52.

Broadly the invention contemplates a simple and economical construction wherein a maximum sealing is effected and all of the parts subject to wear are readily replaceable.

What is claimed is:

1. A valve comprising a body having a gate chamber extending therethrough, a pair of aligned flow ports in said body, top and bottom flange closure plates applied to the ends of said body, a gate stem sealing and moving assembly carried by the top plate, a stem extending therethrough, a gate on said stem of a configuration to close said ports, a sealing saddle of resilient material disposed in said chamber on said bottom plate and having a curved seat with inclined side walls to receive said gate as it moves to close said ports so as to provide a seal about the lower portion of the gate, a sealing cap carried by said stem and gate and having its ends shaped to contact said side walls, and a retainer cap overlying said sealing cap to confine said saddle and cap about said gate as said stem moves the gate to closed position.

2. In a gate valve having a gate chamber therein, a resilient saddle seat for the gate member filling said chamber below the valve flow passage, said saddle having a rounded seating face to receive the lower portion of the gate member, a sealing cap assembly including a resilient portion, and cooperating smooth sealing faces on said saddle and portion to provide a seal of resilient material about the gate member.

3. In a gate valve having a gate chamber therein, a flow passage through the valve, a resilient saddle seat for the gate member in said chamber below the valve flow passage, said saddle having a rounded seating face to receive the lower portion of the gate member, a sealing cap assembly carried by the gate member and including a resilient portion, and cooperating smooth sealing faces on said saddle and portion to provide a seal of resilient material about the gate member, said assembly including a rigid member movable with the gate to confine said sealing material and establish a pressure therein in excess of the pressure being valved.

4. In a gate valve, a cylindrical gate, a stem affixed radially thereof to move said gate, and a co-axial sealing cap assembly on the gate.

5. In a gate valve, a cylindrical gate, a stem affixed radially thereof to move said gate, and a co-axial sealing cap assembly on the gate, including a curved cap plate and a resilient sealing portion extending about the upper periphery of said gate.

6. In a gate valve a resilient sealing assembly to enclose the gate member in closed position including a base saddle having a curved sealing face for the valve gate and flat sealing faces extending therefrom, and a sealing cap having a resilient portion to fit about the remainder of the gate and to seal with said flat faces.

7. A valve comprising a body, a valve chamber therein, a resilient sealing member disposed in the base of said chamber, a valve member shaped to fit said sealing member and to engage therewith, a second sealing member disposed on top of said valve member and fitted thereabout and to also engage said first sealing member, means to move said valve member to close the flow ports, and additional means on said valve member and movable therewith to cooperate with said body to confine said sealing members in position enclosing the transverse periphery of said valve member.

ALEXANDER S. VOLPIN.